T. J. FOX.
LIQUID CUSHIONING DEVICE.
APPLICATION FILED DEC. 1, 1911.
1,035,339.
Patented Aug. 13, 1912.
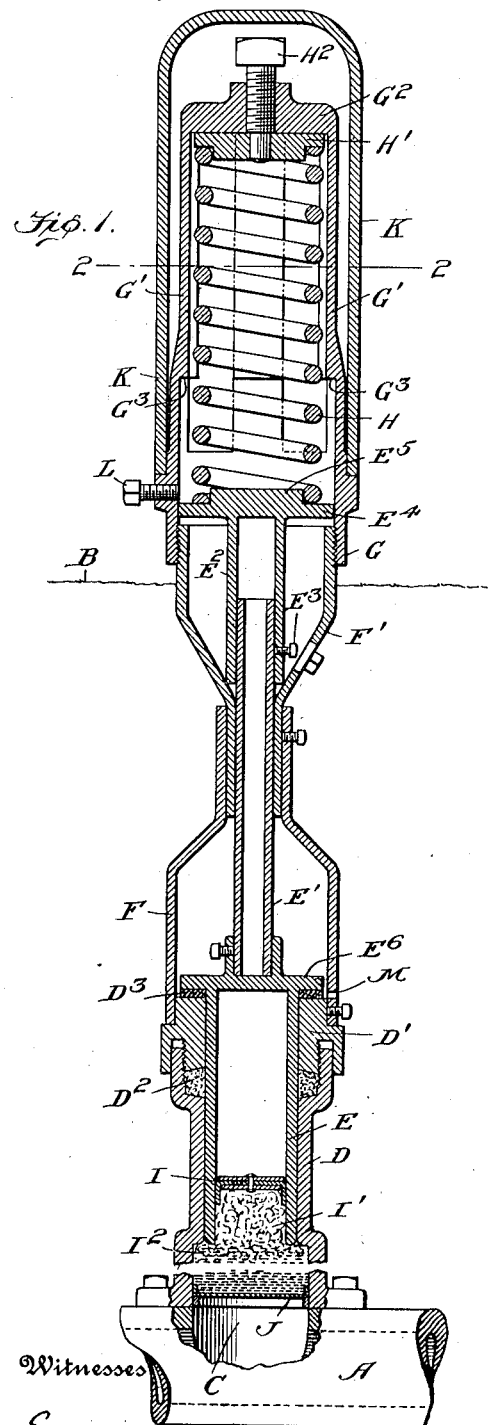
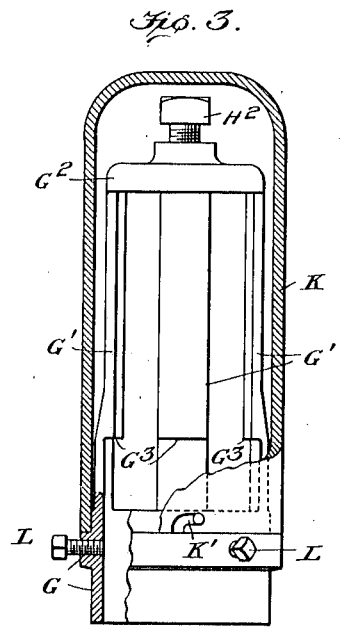
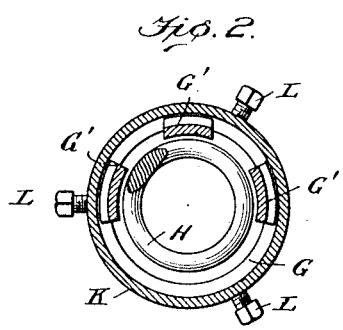
Inventor
Thomas J. Fox
By Wallace Brune,
Attorney.
Witnesses
Edwin L. Bradford
Robert Craig Greene

UNITED STATES PATENT OFFICE.

THOMAS J. FOX, OF MEMPHIS, TENNESSEE, ASSIGNOR TO J. A. BILLIONS, OF SHELBY COUNTY, TENNESSEE.

LIQUID CUSHIONING DEVICE.

1,035,339.  Specification of Letters Patent.  Patented Aug. 13, 1912.

Application filed December 1, 1911. Serial No. 663,280.

*To all whom it may concern:*

Be it known that I, THOMAS J. FOX, a citizen of the United States, residing at Memphis, in the county of Shelby and State of Tennessee, have invented certain new and useful Improvements in Liquid Cushioning Devices, of which the following is a specification, reference being had therein to the accompanying drawing.

My invention relates to devices intended for cushioning the pressure developed in pipes by suddenly arresting the flow of liquid therein. This end is attained by providing a chamber into which liquid may be temporarily forced, against yielding resistance when the pressure becomes excessive and from which it may be automatically expelled when the pressure falls.

The embodiment of the invention chosen for illustration is especially intended for use in connection with pipes buried in the earth, provision being made for making certain adjustments and the more common repairs without disturbing the earth, and also for initially adjusting the same device for pipes at various distances below the surface of the ground.

In the accompanying drawings, Figure 1 represents the devices in use upon a horizontal pipe, most of the parts being shown in axial section. Fig. 2 is a section on the line 2—2, Fig. 1. Fig. 3 shows in elevation a part of the devices seen in Fig. 1.

In these figures, A represents the pipe, usually for water, to which the cushioning apparatus is applied and B the surface of the ground above the pipe. The pipe has above an opening C and alining with this opening is a cylinder D in which works a hollow upwardly closed plunger E having a rod or stem made up of telescoping parts E', E² rigidly locked together by a set screw E³ or the like. Into the enlarged end of the cylinder is screwed an annular cap D' which presses against suitable packing D². To the cap is locked an upwardly extending sleeve or casing F, contracted at some distance above the plunger and telescoping with the similarly contracted lower portion of a second sleeve F' the upper end of which is in threaded engagement with the lower tubular portion G of cage-like structure having vertical arms G' connecting the portion G with a disk or plate G² above. The plunger rod extends upward into this cage and is there provided with a disk E⁴ fitting the interior of the cage, provided with a central boss E⁵ and limited in its upward movement by shoulders G³ of the arms G'. The disk and its boss support the lower end of a heavy spring coil H the upper end of which acts against a disk H' vertically adjusted, to vary the tension of the spring, by means of a screw H² working in the disk H'. In the lower portion of the hollow plunger works a piston head I, and the space in the plunger and below the head I is filled with soft grease I' containing some fibrous material to aid in retaining it in place. The lower portion of the cylinder, below the path of the plunger, is of larger diameter and in this portion is placed a sliding disk or diaphragm J, preferably having a marginal upturned portion to insure its remaining perpendicular to the axis of the cylinder. The space between this disk J and the plane of the lower end of the plunger is filled with very soft grease which readily flows under pressure. The upper end of the plunger is provided with a peripheral flange E⁶ between which and the upper surface of the cap D² a yielding washer D³ is normally compressed by the spring above.

The cage lies wholly above the ground and all the parts above the cage member G are covered and protected by a removable cap K normally held in place by a bayonet lock K', Fig. 3.

It will be apparent that the water in the pipe if under pressure always tends to compress the spring, and but for the spring would always hold the plunger at the upper limit of its path. As the spring and adjacent parts are the parts most often needing attention or repair, I provide screws L passing inward through the cage member G just above the plane of the disk E⁴. If these screws are advanced into the path of the disk they hold it against upward movement, and the cap being then removed repairs may be made or the spring may be replaced without disturbing parts below the disk, the arms G' being so spaced that the spring may pass between two of them.

In installing the apparatus, the plunger stem and the inclosing sleeves are adjusted to such length as to bring the cage slightly above the surface of the ground.

In operation, a sudden stoppage of flow in the pipe tending to create a water-hammer pressure causes the disk to rise pressing the grease upward against the plunger and piston head therein, the air above the latter acting as a cushion. The entire piston also rises bodily, if the pressure exceeds a low limit, compressing the spring above. The area of the plunger is made not less than the cross sectional area of the pipe so that the whole body of water in the pipe is gradually brought to rest with no other strain than such as the cushioning devices control. Were the opening for the escape of the water smaller than the pipe, the sudden hammer blow must materially strain the pipe before the water could escape.

It is to be noted that in devices of this class it is very desirable that water should not pass the plunger since it is not easy to obtain access to these parts of the device. For this reason, the grease chamber is provided giving a seal, below, of a semi-liquid, water-repelling material which is also a lubricant, and so arranged as to be pressed into the joint around the plunger by whatever pressure may be applied. The plunger is also made very long so that should water pass the body of the grease it must still pass through a long, very narrow, and greasy passage to reach the first packing and must further pass a similar long channel to reach the compressible washer which offers a further obstruction. If water should nevertheless pass, it would escape through a passage M usually provided when the device is not to be used in wet earth. It is further evident that forcible bodily rotation of the upper part of the device will screw the cylinder cap down increasing, when necessary, the pressure on the packing around the plunger.

The relative proportions of the parts is such that the body of the grease will fill the entire space otherwise left in raising the plunger to its highest point.

Obviously when the pressure in the pipe falls sufficiently, the spring and the air cushion restore all the parts to initial position.

What I claim is:

1. In apparatus of the class described, the combination with a pipe, of a cylinder in communication with the interior of the pipe, a plunger working in the cylinder, a spring resisting movement of the plunger away from the pipe and means whereby substantially the entire pressure of liquid in the pipe may be transmitted to the plunger through a cushioning body of confined air.

2. In apparatus of the class described, the combination with a liquid conveying pipe, of a cylinder communicating with the interior of said pipe through a passage nowhere of less cross-sectional area than the pipe, a plunger working in said cylinder and yieldingly resisting pressure of liquid from the pipe and a free plunger head working in said cylinder at some distance from said plunger and adapted to transmit pressure from the liquid in the pipe to air confined between the plunger and free plunger head.

3. In apparatus of the class described, the combination with a liquid conveying pipe, of a cylinder provided with a plunger and communicating with the interior of said pipe through a passage adapted to receive and confine a flowing lubricant filling the passage and transmitting to the plunger the pressure of liquid in the pipe, and means opposing a yielding resistance to the movement of the plunger by said pressure.

4. The combination with a fluid conducting pipe of a cylinder communicating with the interior of the pipe through a passage as large as the interior of the pipe, a plunger working in the cylinder, a movable diaphragm extending across the passage between the pipe and plunger, a body of flowing lubricant filling the space between the diaphragm and plunger, and a yielding device resisting movement of the plunger under pressure transmitted from the liquid in the pipe.

5. The combination with a pipe, of a cylinder communicating with the interior of the pipe, a plunger working in the cylinder and having a stem of adjustable length, a casing of adjustable length secured to the cylinder, inclosing said stem and extending beyond its free end, and a spring interposed between said free end and a portion of said casing.

In testimony whereof I affix my signature in presence of two witnesses.

THOMAS J. FOX.

Witnesses:
ROBERT CRAIG GREENE,
ARTHUR L. BRYANT.